US00RE47052E

(19) United States
(12) Reissued Patent
Kim et al.

(10) Patent Number: US RE47,052 E
(45) Date of Reissued Patent: *Sep. 18, 2018

(54) CONTROL SIGNAL TRANSMITTING METHOD AND APPARATUS IN RELAY STATION

(71) Applicant: LG Electronics Inc., Seoul (KR)

(72) Inventors: Hak Seong Kim, Anyang-si (KR); Han Byul Seo, Anyang-si (KR); Ki Jun Kim, Anyang-si (KR)

(73) Assignee: LG ELECTRONICS INC., Seoul (KR)

( * ) Notice: This patent is subject to a terminal disclaimer.

(21) Appl. No.: 14/631,685

(22) Filed: Feb. 25, 2015

Related U.S. Patent Documents

Reissue of:
(64) Patent No.: 8,761,077
Issued: Jun. 24, 2014
Appl. No.: 13/254,714
PCT Filed: Mar. 5, 2010
PCT No.: PCT/KR2010/001372
§ 371 (c)(1),
(2) Date: Sep. 2, 2011
PCT Pub. No.: WO2010/101432
PCT Pub. Date: Sep. 10, 2010

U.S. Applications:
(63) Continuation of application No. 14/598,004, filed on Jan. 15, 2015, now Pat. No. Re. 46,257, which is an
(Continued)

(30) Foreign Application Priority Data

Mar. 4, 2010 (KR) ..... 10-2010-0019389

(51) Int. Cl.
*H04B 7/14* (2006.01)
*H04L 1/18* (2006.01)
(Continued)

(52) U.S. Cl.
CPC ..... *H04L 1/1854* (2013.01); *H04L 1/1861* (2013.01); *H04L 5/0037* (2013.01);
(Continued)

(58) Field of Classification Search
CPC ... H04L 1/1854; H04L 1/1861; H04L 5/0037; H04L 5/0053; H04L 1/0026; H04L 25/24; H04L 2001/0097; H04W 84/045
See application file for complete search history.

(56) References Cited

U.S. PATENT DOCUMENTS 8,737,346 B2 5/2014 Che et al.
8,879,462 B2 11/2014 Zhang et al.
(Continued)

OTHER PUBLICATIONS

3GPP TSG-RAN WG1 #51bis, R1-080268, "UL ACK/NACK logical index mapping relation details", LG Electronics, Jan. 14-18, 2008; pp. 1-4.
(Continued)

*Primary Examiner* — Eric B Kiss
(74) *Attorney, Agent, or Firm* — Birch, Stewart, Kolasch & Birch, LLP

(57) ABSTRACT

A method of transmitting a control signal of a relay station is provided. The method includes: receiving a control signal and data from a base station in a first subframe; and transmitting an acknowledgement/negative acknowledgement (ACK/NACK) signal for the data to the base station in a second subframe, wherein a radio resource for transmitting the ACK/NACK signal is determined by a radio resource to which the control signal received in the first subframe is allocated and by a logical physical uplink control channel (PUCCH) index received by using a higher layer signal.

4 Claims, 26 Drawing Sheets

Related U.S. Application Data application for the reissue of Pat. No. 8,761,077, filed as application No. PCT/KR2010/001372 on Mar. 5, 2010.

(60) Provisional application No. 61/157,889, filed on Mar. 5, 2009, provisional application No. 61/158,415, filed on Mar. 9, 2009, provisional application No. 61/233,132, filed on Aug. 12, 2009.

(51) Int. Cl.

| | |
|---|---|
| ***H04L 5/00*** | (2006.01) |
| ***H04L 25/24*** | (2006.01) |
| *H04W 84/04* | (2009.01) |
| *H04L 1/00* | (2006.01) |

(52) U.S. Cl.

CPC ..... *H04L 5/0053* (2013.01); *H04L 25/24* (2013.01); *H04L 1/0026* (2013.01); *H04L 2001/0097* (2013.01); *H04W 84/045* (2013.01)

(56) References Cited

U.S. PATENT DOCUMENTS

| | | | | |
|---|---|---|---|---|
| 2008/0248793 | A1* | 10/2008 | Chang et al. | 455/422.1 |
| 2008/0310540 | A1 | 12/2008 | Tiirola et al. | |
| 2009/0207797 | A1* | 8/2009 | Shen et al. | 370/329 |
| 2011/0211538 | A1* | 9/2011 | Kakura | 370/329 |
| 2011/0299490 | A1* | 12/2011 | Nordstrom et al. | 370/329 |
| 2012/0093104 | A1 | 4/2012 | Tiirola et al. | |
| 2012/0320844 | A1 | 12/2012 | Lunttila et al. | |

OTHER PUBLICATIONS

3GPP TSG-RAN WG1 #53bis, R1-082463, "Mapping from CCE index to PUCCH resource TDD", Ericsson, Jun. 23-27, 2008; (3 pages).

* cited by examiner

CONTROL SIGNAL TRANSMITTING METHOD AND APPARATUS IN RELAY STATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is *a Continuation reissue application of Reissue application Ser. No. 14/598,004 filed on Jan. 15, 2015 (now U.S. Pat. No. RE46,257 issued on Dec. 27, 2016), which is a reissue of U.S. Pat. No. 8,761,077 issued on Jun. 24, 2014, which is* the National Phase of PCT/KR2010/001372 filed on Mar. 5, 2010, which claims the benefit under 35 U.S.C. § 119(e) of U.S. Provisional Application Nos. 61/157,889, 61/158,415, 61/233,132 filed on Mar. 5, 2009, Mar. 9, 2009 and Aug. 12, 2009 respectively, and under 35 U.S.C. § 119(a) to Patent Application No. KR 10-2010-0019389 filed in Republic of Korea on Mar. 4, 2010, all of which are hereby expressly incorporated by reference into the present application. *More than one reissue application has been filed for the reissue of U.S. Pat. No. 8,761,077: the present application (U.S. application Ser. No. 14/631,685) and U.S. application Ser. No. 14/598,004.*

TECHNICAL FIELD

The present invention relates to wireless communications, and more particularly, to a method and apparatus for transmitting an uplink control signal by a relay station to a base station.

BACKGROUND ART

Standardization works of international mobile telecommunication (IMT)-advanced which is a next generation (i.e., post 3rd generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 100 Mbps in a fast moving state.

3rd generation partnership project (3GPP) prepares a system standard satisfying requirements of the IMT-advanced, long term evolution (LTE)-advanced, which is an improved version of LTE based on orthogonal frequency division multiple access (OFDMA)/single carrier-frequency division multiple access (SC-FDMA) transmission. The LTE-advanced is one of promising candidates for the IMT-advanced. Technology related to a relay station is one of main technologies for the LTE-advanced.

A relay station (RS) is a device for relaying a signal between a base station (BS) and a user equipment (UE), and is used for cell coverage extension and throughput enhancement of a wireless communication system.

The RS can transmit a control signal to the BS. Examples of the transmitted signal may include a hybrid automatic repeat request (HARQ) acknowledgement/negative acknowledgement (ACK/NACK), a channel quality indicator (CQI), a scheduling request (SR), etc. A mechanism of allocating a radio resource needs to be considered when the RS transmits the control signal to the BS.

In addition, the UE can also transmit the control signal to the BS in the wireless communication system including the RS. Therefore, it is not preferable if a method of transmitting the control signal by the RS to the BS has an effect on a procedure of transmitting the control signal by the UE to the BS. That is, it is preferable to maintain backward compatibility with the legacy UE.

Accordingly, there is a need for a method and apparatus for transmitting a control signal of an RS by considering the aforementioned aspects.

SUMMARY OF INVENTION

Technical Problem

The present invention relates to a method and apparatus for transmitting a control signal of a relay station.

Technical Solution

According to an aspect of the present invention, a method of transmitting a control signal of a relay station is provided. The method includes: receiving a control signal and data from a base station in a first subframe (*i.e., sub-frame*); and transmitting an acknowledgement/negative acknowledgement (ACK/NACK) signal for the data to the base station in a second subframe, wherein a radio resource for transmitting the ACK/NACK signal is determined by a radio resource to which the control signal received in the first subframe is allocated and by a logical physical uplink control channel (PUCCH) index received by using a higher layer signal.

According to another aspect of the present invention, an apparatus for wireless communication is provided. The apparatus includes: a signal generator for generating and transmitting a radio signal; and a processor coupled to the signal generator, wherein the processor receives a control signal and data from a base station in a first subframe, and transmits an ACK/NACK signal for the data to the base station in a second subframe, wherein the ACK/NACK signal is allocated to a radio resource determined by a radio resource to which the control signal received in the first subframe is allocated by a logical physical uplink control channel (PUCCH) index received by using a higher layer signal.

Advantageous Effects

According to the present invention, a relay station can transmit a control signal without having an effect on transmission of an uplink control signal of a user equipment. Therefore, it is possible to maintain backward compatibility with a legacy system consisting of a base station and the user equipment.

MODE FOR INVENTION

Figure 1:
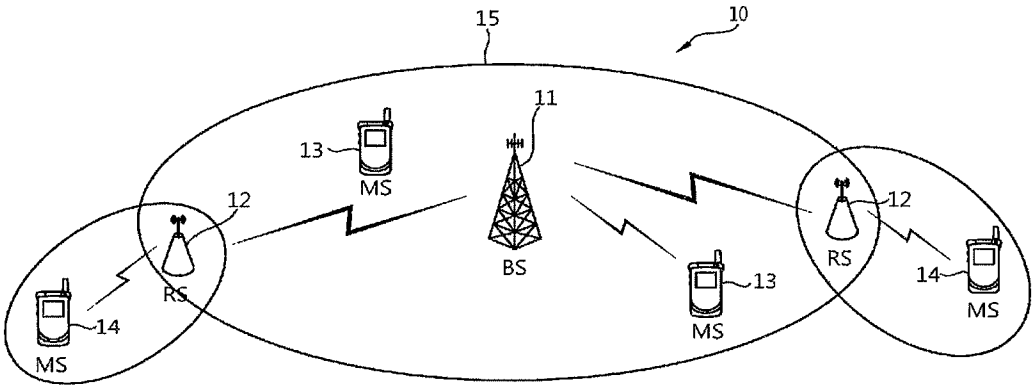
FIG. 1 shows a wireless communication system employing a relay station (RS).

FIG. 1 shows a wireless communication system employing a relay station (RS).

Referring to FIG. 1, a wireless communication system 10 employing an RS includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a user equipment (UE) 13 and may be referred to as another terminology, such as an evolved node-B (eNB), a base transceiver system (BTS), an access point, an access network (AN), etc. The BS 11 can perform functions such as connectivity between an RS 12 and a UE 14, management, control, resource allocation, etc.

The RS 12 is a device for relaying a signal between the BS 11 and the UE 14, and is also referred to as another terminology such as a relay node (RN), a repeater, a relay, etc. A relay scheme used in the RS may be either amplify and forward (AF) or decode and forward (DF), and the technical features of the present invention are not limited thereto.

The UEs 13 and 14 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. Hereinafter, a macro UE (or Ma UE) 13 denotes a UE that directly communicates with the BS 11, and a relay UE (or Re UE) 14 denotes a UE that communicates with the RS. Even if the Ma UE 13 exists in a cell of the BS 11, the Ma UE 13 can communicate with the BS 11 via the RS 12 to improve a data transfer rate depending on a diversity effect.

Hereinafter, a downlink (DL) denotes communication from the BS 11 to the Ma UE 13, and an uplink (UL) denotes communication from the Ma UE 13 to the BS 11. A backhaul DL denotes communication from the BS 11 to the RS 12. A backhaul UL denotes communication from the RS 12 to the BS 11.

The wireless communication system 10 employing the RS is a system supporting bidirectional communication. The bidirectional communication may be performed by using a time division duplex (TDD) mode, a frequency division duplex (FDD) mode, etc. When in the TDD mode, different time resources are used in UL transmission and DL transmission and in backhaul UL transmission and backhaul DL transmission. When in the FDD mode, different frequency resources are used in UL transmission and DL transmission and in backhaul UL transmission and backhaul DL transmission.

Figure 2:
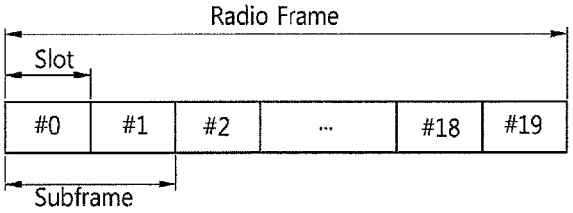
FIG. 2 shows a radio frame structure.

FIG. 2 shows a radio frame structure.

Referring to FIG. 2, a radio frame consists of 10 subframes, and one subframe consists of two slots. A transmission time interval (TTI) is defined as a time for transmitting one subframe. For example, one subframe may have a length of 1 millisecond (ms), and one slot may have a length of 0.5 ms.

Figure 3:
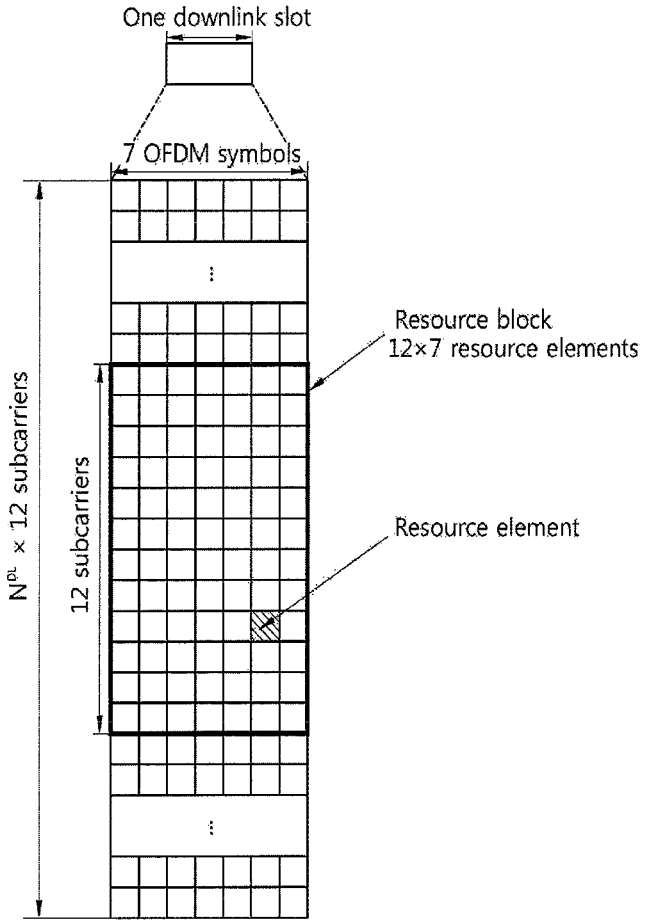
FIG. 3 is a diagram showing an example of a resource grid for one downlink slot.

FIG. 3 is a diagram showing an example of a resource grid for one DL slot.

Referring to FIG. 3, the DL slot includes a plurality of orthogonal frequency division multiplexing (OFDM) symbols in a time domain. Although it is described herein that one DL slot includes 7 OFDM symbols, and one resource block (RB) includes 12 subcarriers in a frequency domain, the present invention is not limited thereto.

Each element on the resource grid is referred to as a resource element (RE). One RB includes 12×7 REs. The number $N^{DL}$ of RBs included in the DL slot depends on a DL transmission bandwidth configured in a cell.

The resource grid for one DL slot of FIG. 3 is also applicable to a resource grid for a UL slot. However, the UL slot includes a plurality of single carrier-frequency division multiple access (SC-FDMA) symbols in a time domain.

Figure 4:
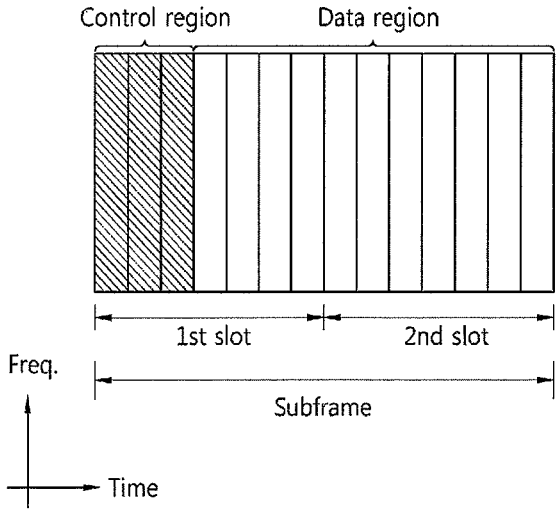
FIG. 4 shows a downlink subframe structure.

FIG. 4 shows a DL subframe structure.

Referring to FIG. 4, a subframe includes two consecutive slots. A maximum of three OFDM symbols located in a front portion of a $1^{st}$ slot within the subframe correspond to a control region to which a physical downlink control channel (PDCCH) is allocated. The remaining OFDM symbols correspond to a data region to which a physical downlink shared channel (PDSCH) is allocated. In addition to the PDCCH, control channels such as a physical control format indicator channel (PCFICH), a physical HARQ indicator channel (PHICH), etc., can be allocated to the control region. The UE can read data information transmitted through the PDSCH by decoding control information transmitted through the PDCCH. Although the control region includes three OFDM symbols herein, this is for exemplary purposes only. The number of OFDM symbols included in the control region of the subframe can be known by using the PCFICH.

The control region consists of a plurality of control channel elements (CCEs) that is a logical CCE stream. Hereinafter, the CCE stream denotes a set of all CCEs constituting the control region in one subframe. The CCE corresponds to a plurality of resource element groups (REGs). For example, the CCE may correspond to 9 REGs. The REG is used to define mapping of a control channel onto a resource element (RE). For example, one REG may consist of 4 REs. Therefore, one CCE may include 36 REs.

A plurality of PDCCHs may be transmitted in the control region. The PDCCH carries control information such as scheduling allocation. The PDCCH is transmitted on an aggregation of one or several consecutive CCEs. A PDCCH format and the number of available PDCCH bits are determined according to the number of CCEs constituting the CCE aggregation. Hereinafter, the number of CCEs used for PDCCH transmission is referred to as a CCE aggregation level. The CCE aggregation level is a CCE unit for searching for the PDCCH. A size of the CCE aggregation level is defined by the number of contiguous CCEs. For example, the CCE aggregation level may be an element of {1, 2, 4, 8}.

Table 1 below shows examples of the PDCCH format and the number of available PDCCH bits according to the CCE aggregation level.

TABLE 1

| PDCCH format | CCE aggregation level | Number of resource element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Control information transmitted through the PDCCH is referred to as downlink control information (hereinafter, DCI). The DCI includes UL or DL scheduling information, a UL power control command, control information for paging, control information for indicating a random access channel (RACH) response, etc. Examples of a DCI format include a format 0 for scheduling of a physical uplink shared channel (PUSCH), a format 1 for scheduling of one physical downlink shared channel (PDSCH) codeword, a format 1A for compact scheduling of the one PDSCH codeword, a format 1B for simple scheduling for rank-1 transmission of a single codeword in a spatial multiplexing mode, a format 1C for significantly compact scheduling of a downlink shared channel (DL-SCH), a format 2 for scheduling of the PDSCH in a closed-loop spatial multiplexing mode, a format 2A for scheduling of the PDSCH in an open-loop spatial multiplexing mode, and formats 3 and 3A for transmission of a transmission power control (TPC) command for a UL channel.

Figure 5:
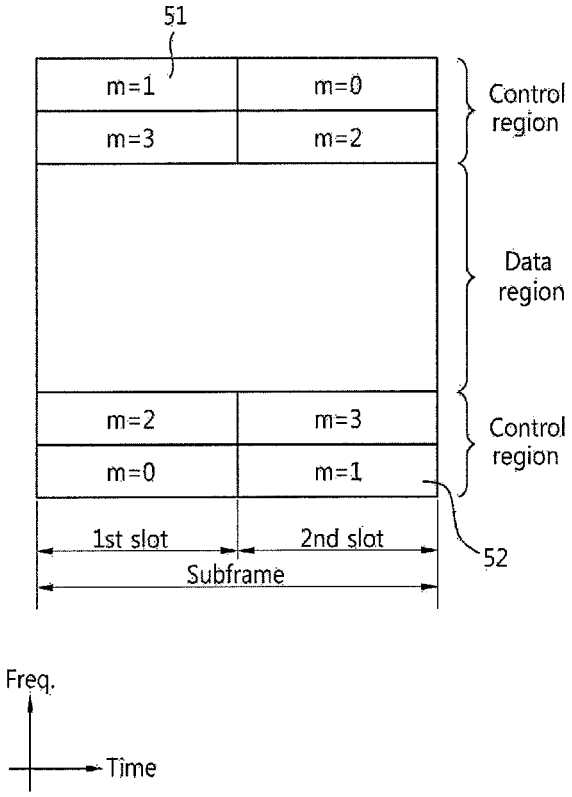
FIG. 5 shows an uplink subframe structure.

FIG. 5 shows a UL subframe structure.

Referring to FIG. 5, a UL subframe can be divided into a control region and a data region. The control region is a region to which a physical uplink control channel (PUCCH) for carrying UL control information is allocated. The data region is a region to which a physical uplink shared channel (PUSCH) for carrying user data is allocated. To maintain a single-carrier property in SC-FDMA, resource blocks consecutive in a frequency domain are allocated to a single UE as a resource. The single UE cannot simultaneously transmit the PUCCH and the PUSCH.

In the subframe, the PUCCH for one UE is allocated in a resource block (RB) pair. RBs belonging to the RB pair occupy different subcarriers in each of $1^{st}$ and $2^{nd}$ slots. This is called that the RB pair allocated to the PUCCH is frequency-hopped in a slot boundary. In FIG. 5, m is a location index indicating a frequency-domain location of an RB allocated to the PUCCH in the subframe.

Examples of UL control information transmitted on the PUCCH include a hybrid automatic repeat request (HARQ) acknowledgement/negative acknowledgement (ACK/NACK), a channel quality indicator (CQI) indicating a DL channel state, a scheduling request (SR) as a request for UL radio resource allocation, etc.

The PUCCH can support multiple formats. That is, it is possible to transmit a UL control signal having a different number of bits per subframe according to a modulation scheme. Table 2 below shows an example of the number of bits per subframe and a modulation scheme based on a PUCCH format.

TABLE 2

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

A PUCCH format 1 is used for transmission of an SR. A PUCCH format 1a or format 1b is used for transmission of an HARQ ACK/NACK signal. A PUCCH format 2 is used for transmission of a CQI. A PUCCH format 2a/2b is used for transmission of the CQI and the HARQ ACK/NACK signal.

When the HARQ ACK/NACK signal is transmitted alone in any subframe, the PUCCH format 1a or format 1b can be used, and when the SR is transmitted alone, the PUCCH format 1 can be used. The UE can transmit the HARQ ACK/NACK signal and the SR in the same subframe. For positive SR transmission, the UE can transmit the HARQ ACK/NACK signal by using a PUCCH resource allocated for the SR. For negative SR transmission, the UE can transmit the HARQ ACK/NACK signal by using a PUCCH resource allocated for the ACK/NACK.

Figure 6:
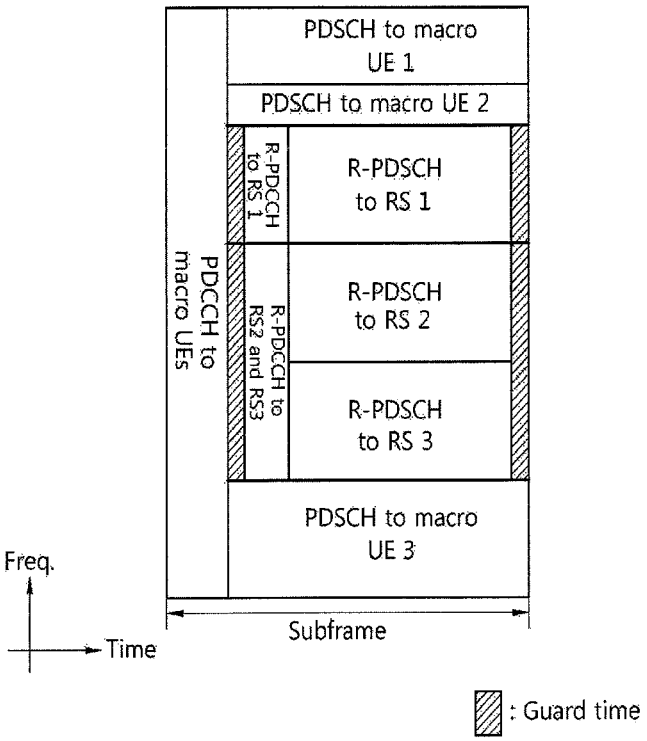
FIG. 6 shows an example of a backhaul downlink subframe.

FIG. 6 shows an example of a backhaul DL subframe.

A BS can allocate a band including K resource blocks to an RS 1 in a frequency domain. The BS can allocate a band including 2K resource blocks to an RS 2 and an RS 3 in the frequency domain. K can be any natural number, for example, may be 6.

A PDCCH on which the BS transmits a control signal to the RS is referred to an R-PDCCH for convenience of explanation. The BS can add a cyclic redundancy check (CRC) for error detection to a DCI to be transmitted to the RS. The CRC is masked with a unique identifier (referred to as a radio network temporary identifier (RNTI)) according to an owner or usage of the R-PDCCH. If the R-PDCCH is for a specific RS, a unique identifier (e.g., cell-RNTI (C-RNTI)) of the RS may be masked to the CRC. Alternatively, if the R-PDCCH is for a paging message transmitted through a paging channel (PCH), a paging indication identifier (e.g., paging-RNTI (P-RNTI)) may be masked to the CRC. If the R-PDCCH is for system information transmitted through a DL-SCH, a system information identifier (e.g., system information-RNTI (SI-RNTI)) may be masked to the CRC.

An R-PDCCH for the RS 1 can include one CCE, and an R-PDCCH for the RS 2 and the RS 3 can include two CCEs. One of the two CCEs may be for the RS 2, and the other may be for the RS 3.

Figure 7:
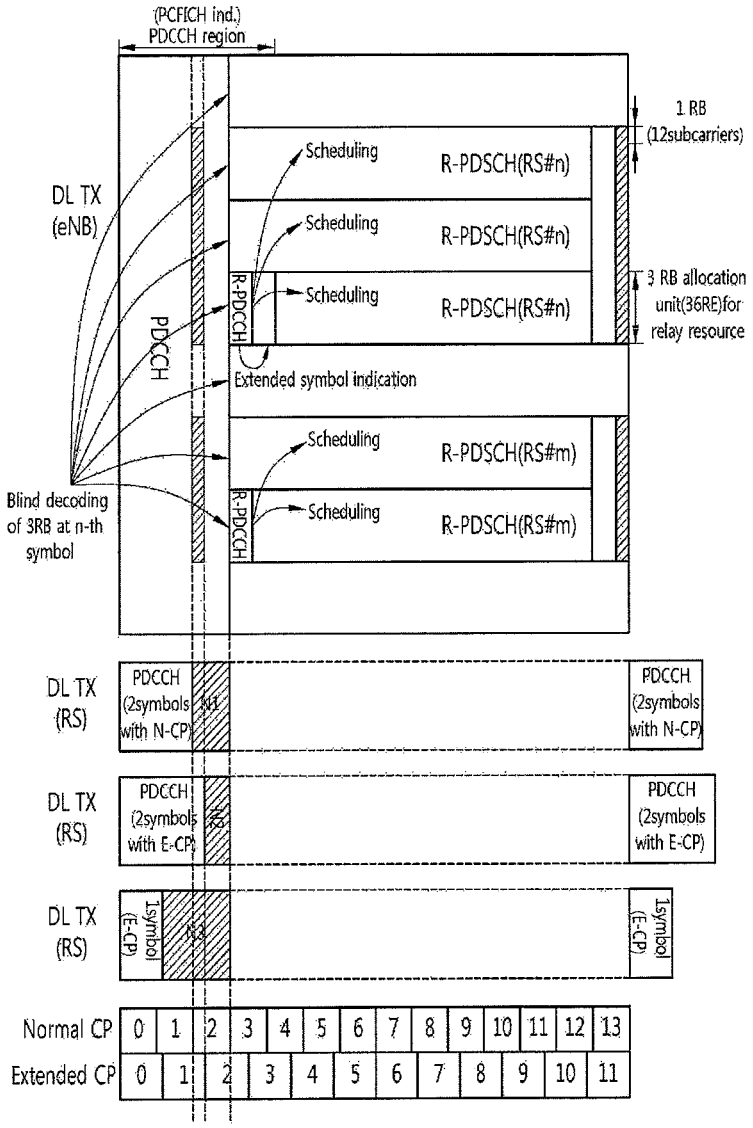
FIG. 7 shows another example of a backhaul downlink subframe.

FIG. 7 shows another example of a backhaul DL subframe.

Each RS can transmit a control signal to a Re UE in first n (e.g., 2) OFDM symbols of a subframe in a time domain. The RS requires a guard period since the RS has to perform switching for receiving the backhaul DL signal from a BS after transmitting the control signal to the Re UE. An OFDM symbol including the guard period can vary according to the number of symbols of the PDCCH to be transmitted by the BS to a Ma UE and the number of symbols of a PDCCH to be transmitted by the RS to the Re UE. In addition, the OFDM symbol including the guard period may have a different index according to whether a cyclic prefix (CP) in use is a normal CP or an extended CP. The R-PDCCH can be included in only one frequency band among a plurality of frequency bands allocated to respective RSs such as RSs #n and #m shown in FIG. 7.

A plurality of R-PDCCHs can be transmitted from the viewpoint of the frequency domain of the subframe. The RS acquires a logical CCE stream by de-mapping a physical resource element (RE) constituting a control region to a CCE for an $n^{th}$ symbol of the subframe. The RS performs monitoring on R-PDCCHs in the CCE stream. Herein, monitoring is an operation performed by the RS to attempt to decode each R-PDCCH according to a DCI format. The BS may not provide the RS with information indicating a position where a corresponding R-PDCCH is located in the CCE stream. The RS searches for its R-PDCCH by monitoring a set of R-PDCCH candidates in the CCE stream. This is called blind decoding (or blind detection). For example, the RS detects its R-PDCCH when there is no CRC error detected through CRC checking after de-masking its C-RNTI in a unit of 3 resource blocks in an $n^{th}$ symbol of a subframe.

Figure 8:
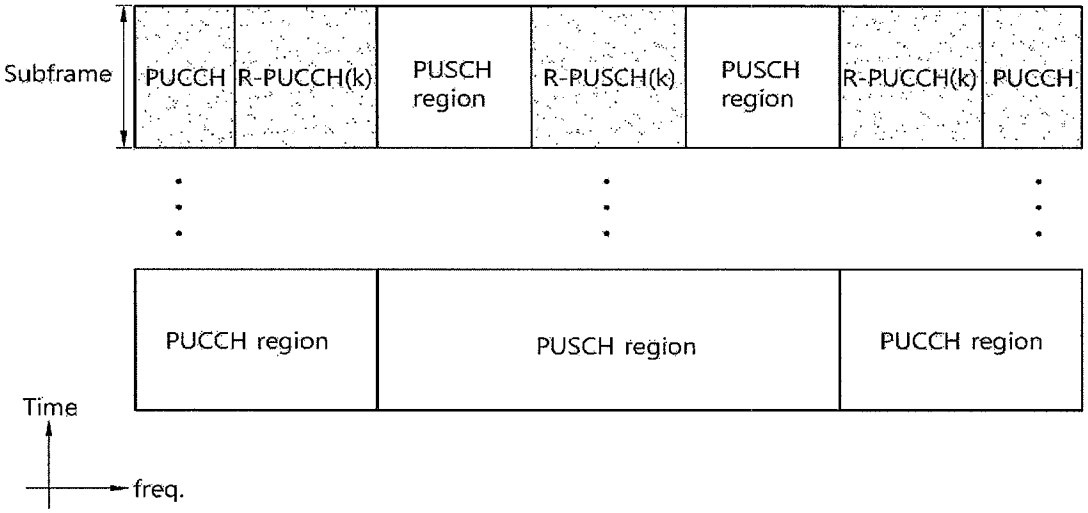
FIG. 8 to FIG. 10 show an example of a backhaul uplink subframe.
Figure 9:
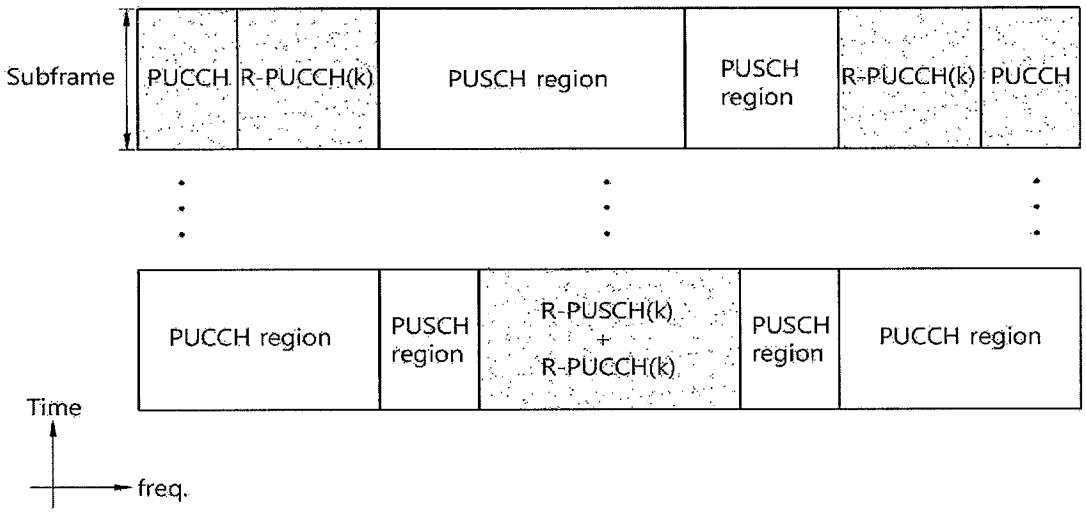
Figure 10:
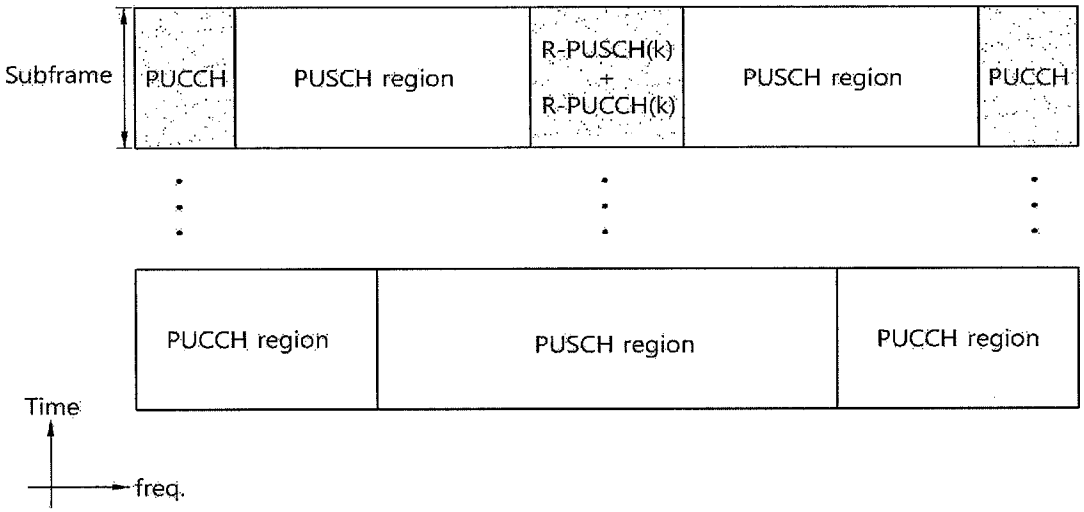

FIG. 8 to FIG. 10 show an example of a backhaul UL subframe.

Hereinafter, an R-PUSCH denotes a PUSCH for transmitting backhaul UL data by an RS to a BS, and an R-PUSCH(k) denotes an R-PUSCH transmitted by an RS k (where k is any natural number) to the BS. An R-PUCCH denotes a PUCCH for transmitting backhaul UL control information by the RS to the BS, and an R-PUCCH(k) denotes an R-PUCCH transmitted by the RS k to the BS.

Referring to FIG. 8, the RS k can transmit the R-PUCCH (k) and the R-PUSCH(k) to the BS in the same subframe unlike the legacy Ma UE. The R-PUCCH(k) can be located adjacent to a PUCCH transmitted by the Ma UE in a frequency domain. In addition, the R-PUCCH(k) can be transmitted through a frequency band shifted in a direction of a PUSCH region with respect to a PUCCH region for transmission of the Ma UE. The R-PUSCH(k) can be located between bands at which the R-PUCCH(k) is transmitted.

Referring to FIG. 9, the RS k can transmit the R-PUCCH (k) in an additional resource block according to a subframe, and transmit the R-PUCCH(k) by piggybacking it onto the R-PUSCH(k) in the same resource block. That is, the RS can transmit the R-PUCCH in an additional resource block other than a resource block for transmitting the R-PUSCH, and can transmit the R-PUCCH together in a resource block for transmitting the R-PUSCH.

Meanwhile, referring to FIG. 10, the RS k always transmits the R-PUCCH(k) by piggybacking it onto a resource block for transmitting the R-PUSCH(k). In FIG. 10, R-PUSCH(k)+R-PUCCH(k) denotes that the R-PUCCH(k) transmitted by the RS k is transmitted by being piggybacked onto the R-PUSCH(k). Meanwhile, FIG. 9 and FIG. 10 are different from FIG. 8 in a sense that the R-PUCCH and the R-PUSCH are not transmitted simultaneously in different frequency bands in the same subframe.

Figure 11:
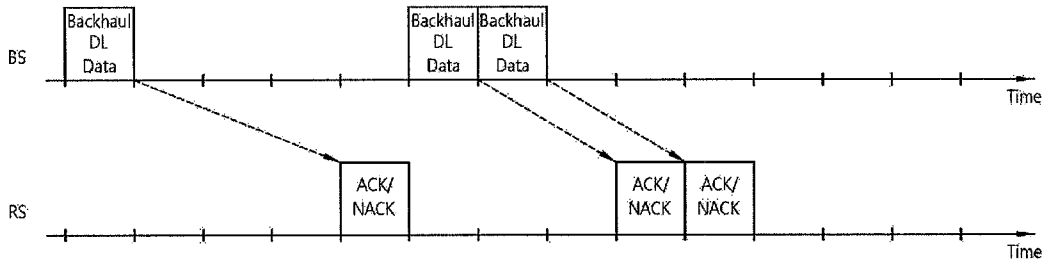
FIG. 11 shows a hybrid automatic repeat request (HARQ) acknowledgement/negative acknowledgement (ACK/NACK) signal between a base station (BS) and an RS.

FIG. 11 shows an HARQ ACK/NACK signal between a BS and an RS.

Referring to FIG. 11, upon receiving backhaul DL data from the BS, the RS transmits the HARQ ACK/NACK signal after a specific time elapses. The backhaul DL data can be transmitted on an R-PDSCH indicated by an R-PDCCH. The HARQ ACK/NACK signal is an ACK signal when the backhaul DL data is successfully decoded, and is a NACK signal when the backhaul DL data is unsuccessfully decoded. Upon receiving the NACK signal, the BS may retransmit the backhaul DL data until the ACK signal is received or until the number of retransmissions reaches the maximum number of retransmissions.

A transmission subframe of the HARQ ACK/NACK signal for the backhaul DL data can be predetermined according to a resource allocation or a transmission time of the backhaul DL data. For example, in a frequency division duplex (FDD) system, when an R-PDSCH is received through a subframe n-4, an HARQ ACK/NACK signal for the R-PDSCH can be transmitted through an R-PUCCH in a subframe n. However, the present invention is not limited thereto, and the transmission subframe of the HARQ ACK/NACK signal can be dynamically reported by the BS through signaling. Alternatively, the transmission subframe can be implicitly reported according to a subframe location or other information. Then, the RS can transmit the HARQ ACK/NACK after 4, 5, or 6 subframes. In this case, the HARQ ACK/NACK can be referred to as a dynamic ACK/NACK. Alternatively, a different transmission subframe of a HARQ ACK/NACK signal can be determined according to a predetermined radio frame period. The RS can determine an R-PUCCH resource index (i.e., a logical/physical R-PUCCH index) required for transmission of the HARQ ACK/NACK by using a CCE index of the R-PDCCH and a logical PUCCH index. Alternatively, the R-PUCCH resource can also be reserved in advance by using higher layer signaling rather than physical layer signaling. That is, the RS can transmit the HARQ ACK/NACK by using the R-PUCCH resource reserved by a higher layer signal such as a radio resource control (RRC) signal.

Hereinafter, a first or specific CCE index to which a corresponding DCI is allocated in the R-PDCCH is denoted by $n_{R\text{-}}$CCE. $n^{(1)}_{PUCCH}$ denotes a PUCCH resource index at which a Ma UE transmits UL control information according to the PUCCH format 1/1a/1b, and $n^{(2)}_{PUCCH}$ denotes a PUCCH resource index at which the Ma UE transmits the UL control information according to the PUCCH format 2/2a/2b. $n^{(1)}_{R\text{-}PUCCH}$ denotes an R-PUCCH resource index at which the RS transmits backhaul UL control information according to the PUCCH format 1/1a/1b, and $n^{(2)}_{R\text{-}PUCCH}$ denotes an R-PUCCH resource index at which the RS transmits the backhaul UL control information according to the PUCCH format 2/2a/2b. A logical PUCCH index transmitted to the RS can be configured by a higher layer signal. The logical PUCCH index transmitted to the RS may be an offset value with respect to the logical PUCCH index transmitted to the Ma UE.

For example, the RS can acquire $n_{R\text{-}CCE}$ through the R-PDCCH received in the subframe n-4, and can determine an R-PUCCH resource index on the basis of the logical PUCCH index given by using the higher layer signal. This can be expressed by Equation 1 below.

$$n^{(1)}_{R\text{-}PUCCH}=n_{R\text{-}CCE}+N^{(1)}_{R\text{-}PUCCH} \quad \text{Equation 1}$$

In Equation 1 above, $n_{R\text{-}CCE}$ may be a first CCE index of corresponding DCI reception in the R-PDCCH received by the RS in the subframe n-4. $N^{(1)}_{R\text{-}PUCCH}$ denotes a logical PUCCH index, and can be configured by the higher layer signal. The R-PUCCH resource index can be used to determine a cyclic shift index and frequency used for transmission of a backhaul UL control signal. In addition, an orthogonal sequence index used to increase transmission capacity can also be determined by using the R-PUCCH resource index. That is, the RS can transmit the backhaul HARQ ACK/NACK in the subframe n by using $n^{(1)}_{R\text{-}PUCCH}$.

If the RS fails to receive the R-PDCCH in the subframe n-4 and receives the R-PDSCH, then the R-PUCCH resource index $n^{(1)}_{R\text{-}PUCCH}$ used for R-PUCCH transmission (i.e., backhaul HARQ ACK/NACK transmission) in the subframe n can be determined by Table 3 below.

TABLE 3

| Value of 'TPC Command for PUCCH' | $n^{(1)}_{R\text{-}PUCCH}$ |
|---|---|
| '00' | The first R-PUCCH resource index configured by the higher layer signal |
| '01' | The second R-PUCCH resource index configured by the higher layer signal |
| '10' | The third R-PUCCH resource index configured by the higher layer signal |
| '11' | The fourth R-PUCCH resource index configured by the higher layer signal. |

Figure 12:
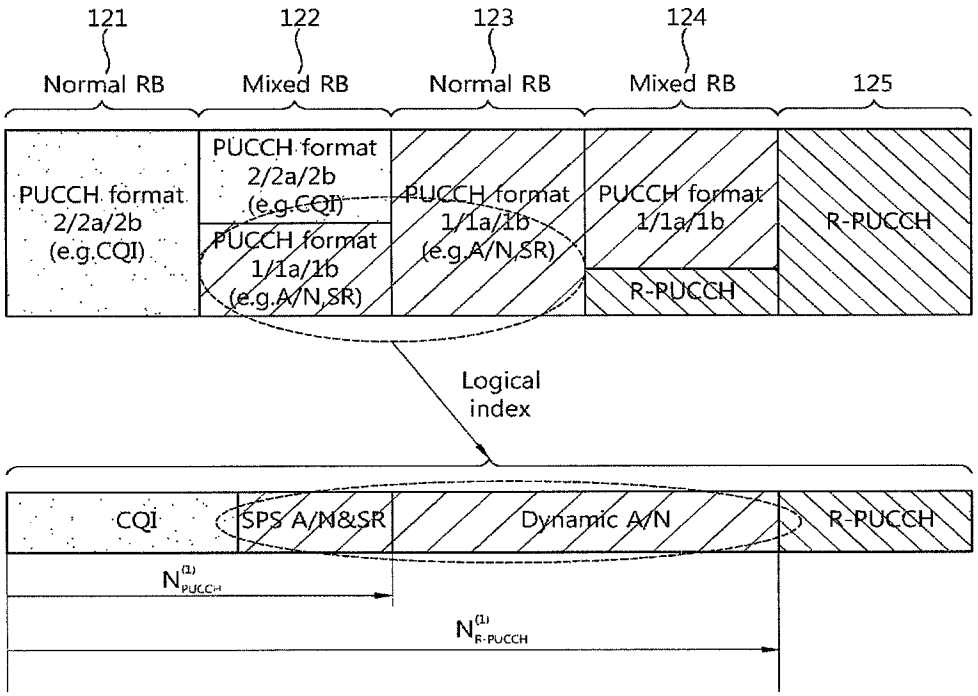
FIG. 12 shows an example of allocation of a resource block (RB), to which a logical physical uplink control channel (PUCCH) or a PUCCH for a relay link (R-PUCCH) is allocated, and a logical PUCCH index.

FIG. 12 shows an example of allocation of a resource block (RB), to which a PUCCH or R-PUCCH is allocated, and a logical PUCCH index.

Referring to FIG. 12, RBs 124 and 125 to which the R-PUCCH is allocated can be located adjacent to RBs 121, 122, and 123 for transmitting the PUCCH in a frequency domain. In addition, the RBs 124 and 125 to which the R-PUCCH is allocated can be allocated to a frequency band shifted in a direction of a PUSCH region (see FIG. 8).

The number of RBs that can be supported as a mixed RB in each slot is equal to or less than one. Different types of control information can be multiplexed in the mixed RB. The mixed RB of FIG. 12 is an RB used for combining the PUCCH format 1/1a/1b and the PUCCH format 2/2a/2b. When one UE transmits an SR by using the mixed RB, another UE in a cell can transmit a CQI by using the mixed RB (see 122). A normal RB is an RB used for one PUCCH format, e.g., the PUCCH format 1/1a/1b or the PUCCH format 2/2a/2b.

For RBs to which the PUCCH or R-PUCCH is allocated, a logical PUCCH index can be logically allocated first to a PUCCH resource and then can be allocated to an R-PUCCH resource. In other words, the logical PUCCH index is allocated by separating the PUCCH resource allocated to the UE and the R-PUCCH resource allocated to the RS. Herein, the PUCCH resource is a resource used for transmission of a control signal by a Ma UE through the PUCCH. The R-PUCCH resource is a resource used by the RS for transmission of a backhaul UL control signal through the R-PUCCH. The PUCCH resource and the R-PUCCH resource can be identified by the logical PUCCH index. Herein, the same mapping as a physical PUCCH index can be used for the logical PUCCH index, or mapping considering an RB-based allocation can be used for the logical PUCCH index. That is, although a start point of the R-PUCCH is reported by using a logical index, it is also possible to allocate the logical index to a first point of the physical RB when mapping to the physical index. This is a case where mapping is performed by separating the R-PUCCH and the PUCCH based on not only the logical RB but also the physical RB. Of course, continuous allocation is also possible without separation.

Figure 13:
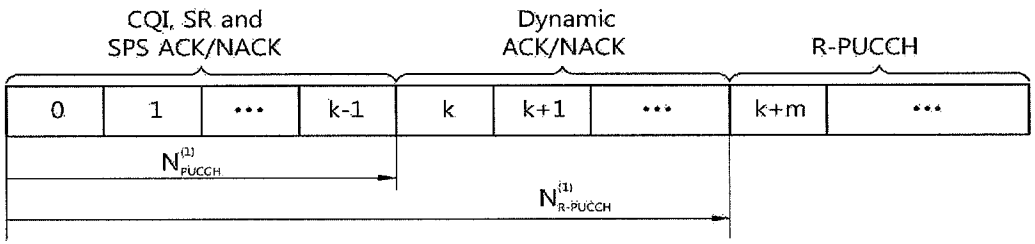
FIG. 13 shows an example of logical PUCCH index allocation.

FIG. 13 shows an example of logical PUCCH index allocation.

Referring to FIG. 13, a logical PUCCH index is allocated in the ascending order starting from 0. The logical PUCCH index can be first allocated for a CQI, SR, and semi-persistent scheduling (SPS) ACK/NACK signal allocated to a Ma UE. Then, the logical PUCCH index is allocated for a dynamic ACK/NACK signal allocated to the Ma UE, and is then allocated for an R-PUCCH resource. Herein, the SPS ACK/NACK is an ACK/NACK for DL data transmitted through the SPS. A BS can transmit $N^{(1)}_{PUCCH}$ to the Ma UE as the logical PUCCH index to indicate a PUCCH transmission resource capable of transmitting UL control information.

The BS can transmit $N^{(1)}_{R\text{-}PUCCH}$ to an RS as the logical PUCCH index to indicate an R-PUCCH transmission resource capable of transmitting backhaul UL control information. The logical PUCCH index value $N^{(1)}_{R\text{-}PUCCH}$ transmitted to the RS may indicate a first index of a physical RB which is the closest in location when a logical index is divided physically, or unlike this, in order to reduce resource waste, it can be mapped to consecutive PUCCH index resources irrespective of division of the physical RB. According to the logical PUCCH index allocation, a PUCCH resource allocated to the legacy UE and an R-PUCCH resource allocated to the RS are divided logically/physically when allocating the logical PUCCH index, and thus it is possible to allocate a backhaul UL control information resource of the RS without having an effect on the legacy LTE system or LTE UE. That is, backward compatibility with the legacy system can be maintained.

Figure 14:
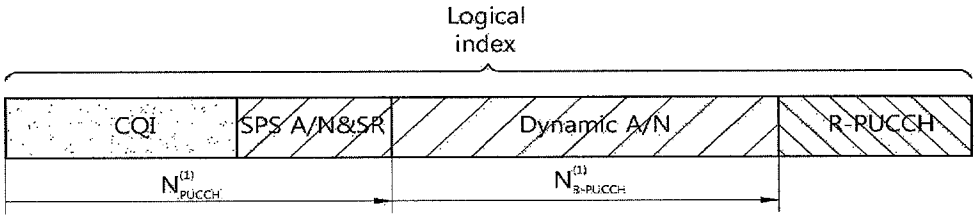
FIG. 14 shows another example of logical PUCCH index allocation.

FIG. 14 shows another example of logical PUCCH index allocation.

The example of FIG. 14 is different from that of FIG. 13 in a sense that a logical PUCCH index $N^{(1)}_{R\text{-}PUCCH}$ given to an RS is an offset value with respect to a logical PUCCH index $N^{(1)}_{PUCCH}$ given to a Ma UE. The RS can acquire an R-PUCCH resource index for transmitting backhaul UL control information by using $N^{(1)}_{PUCCH}$ and $N^{(1)}_{R\text{-}PUCCH}$.

Figure 15:
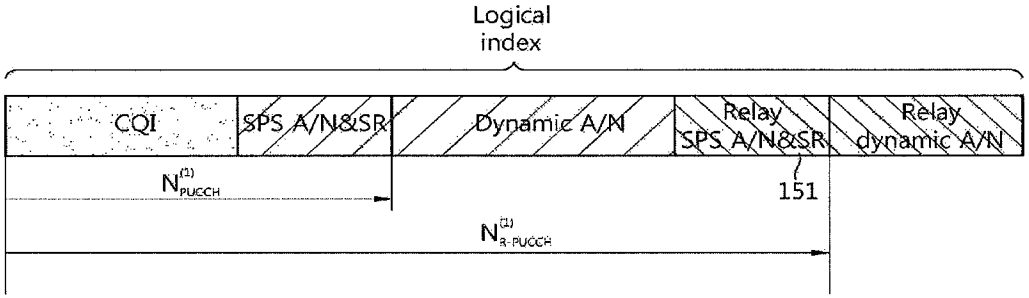
FIG. 15 and FIG. 16 show another example of logical PUCCH index allocation.
Figure 16:
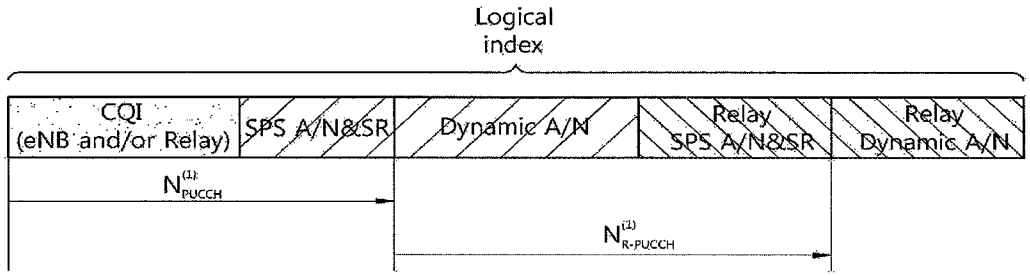

FIG. 15 and FIG. 16 show another example of logical PUCCH index allocation.

Referring to FIG. 15 and FIG. 16, a logical PUCCH index for a scheduling request (SR) and SPS ACK/NACK allocated to an RS can be separated from a logical PUCCH index for a dynamic ACK/NACK. That is, a start position on a resource for the dynamic ACK/NACK can be directly indicated by a logical PUCCH index $N^{(1)}_{R\text{-}PUCCH}$ transmitted to the RS. The RS can acquire an RB (or subcarrier) allocated to the R-PUCCH from the R-PUCCH resource index obtained by Equation 1 above by using the $N^{(1)}_{R\text{-}PUCCH}$.

A resource 151 for the SPS ACK/NACK and SR of the RS can be configured by a higher layer signal and can be reserved. The RS can determine a resource index of an R-PUCCH to be transmitted in a subframe n by using the index $N^{(1)}_{R\text{-}PUCCH}$ and the CCE index of the R-PDCCH received in a subframe n-4. In this case, $N^{(1)}_{R\text{-}PUCCH}$ can indicate a first resource index for the dynamic ACK/NACK.

The example of FIG. 16 is different from that of FIG. 15 in a sense that a logical PUCCH index $N^{(1)}_{R\text{-}PUCCH}$ given to the RS is an offset value with respect to a logical PUCCH index $N^{(1)}_{PUCCH}$ given to a Ma UE. A first resource index for the dynamic ACK/NACK of the Ma UE can be indicated by $N^{(1)}_{PUCCH}$ given to the Ma UE. A first resource index for a dynamic ACK/NACK of the RS can be indicated by $N^{(1)}_{R\text{-}PUCCH}$ given to the RS.

Figure 17:
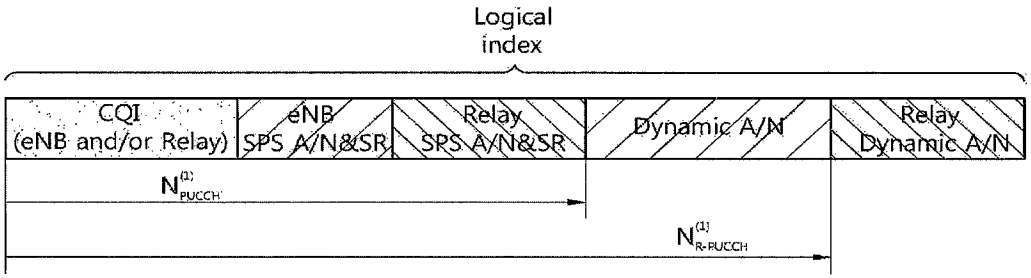
FIG. 17 and FIG. 18 show another example of logical PUCCH index allocation.
Figure 18:
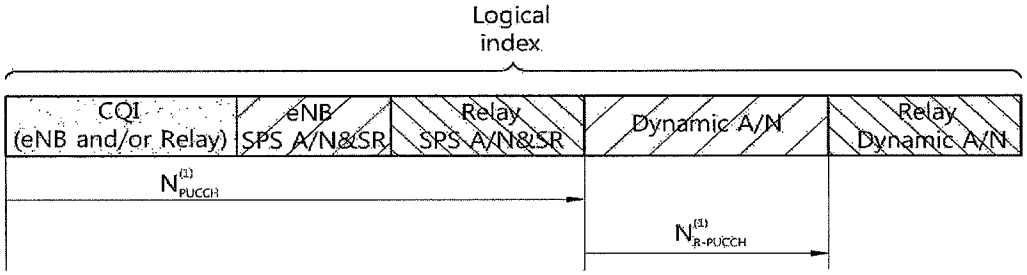

FIG. 17 and FIG. 18 show another example of logical PUCCH index allocation.

Referring to FIG. 17 and FIG. 18, a logical PUCCH index can be allocated by separating an SPS resource region (e.g., a resource region for CQI, ACK/NACK, and SR) of a Ma UE and an RS from a resource region for a dynamic ACK/NACK of the Ma UE and the RS. For example, a logical PUCCH index can be first allocated for a CQI, SPS ACK/NACK, and SR allocated to the Ma UE and an SPS ACK/NACK and SR allocated to the RS, and thereafter can be allocated to a dynamic ACK/NACK allocated to the Ma UE and a dynamic ACK/NACK allocated to the RS. In this case, the logical PUCCH index can be allocated in the order of the dynamic ACK/NACK of the Ma UE and the dynamic ACK/NACK of the RS.

A BS can indicate a start position on a resource for the dynamic ACK/NACK by using the logical PUCCH index $N^{(1)}_{PUCCH}$ transmitted to the Ma UE, and can indicate a start position on a resource for the dynamic ACK/NACK by using the logical PUCCH index $N^{(1)}_{R\text{-}PUCCH}$ to be transmitted to the RS. The logical PUCCH index $N^{(1)}_{R\text{-}PUCCH}$ to be transmitted to the RS directly indicates a location for the dynamic ACK/NACK in FIG. 17, whereas it is an offset value with respect to the logical PUCCH index $N^{(1)}_{PUCCH}$ given to the Ma UE in FIG. 18.

Figure 19:
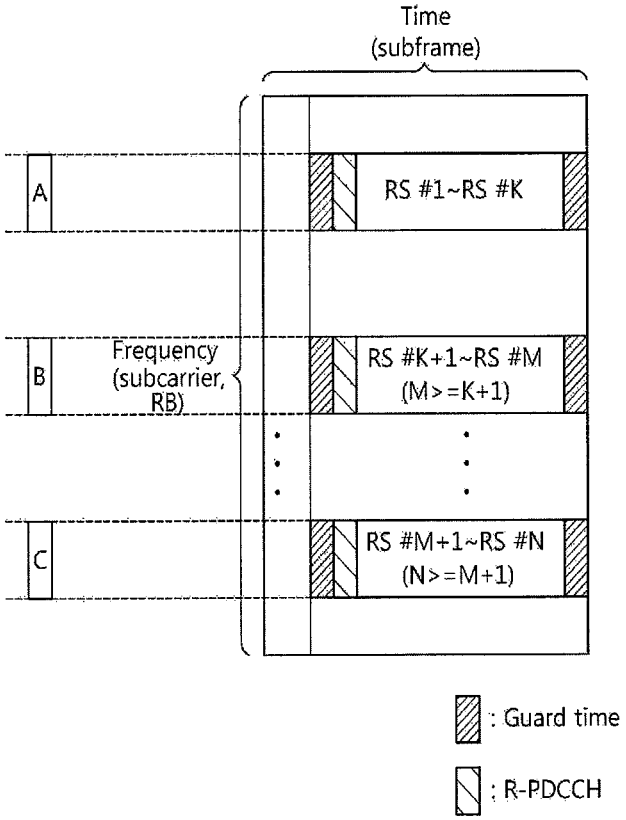
FIG. 19 shows an R-PDCCH transmitted to a plurality of RS groups.

FIG. 19 shows an R-PDCCH transmitted to a plurality of RS groups.

RS s can be classified into two groups according to whether an HARQ ACK/NACK is an SPS ACK/NACK or a dynamic ACK/NACK. In FIG. 19, RSs #1 to #K (hereinafter, an RS group A) can be an RS group to which the SPS ACK/NACK is applied, and RSs #K+1 to #M (hereinafter, an RS group B) can be an RS group to which the dynamic ACK/NACK is applied. RSs #M+1 to #N (hereinafter, an RS group C) can be an RS group to which the SPS ACK/NACK and the dynamic ACK/NACK are applied. In this case, a logical PUCCH index can be allocated independently for each RS group. Frequency bands including an R-PDCCH transmitted to the respective RS groups are denoted by 'A', 'B', and 'C'.

Figure 20:
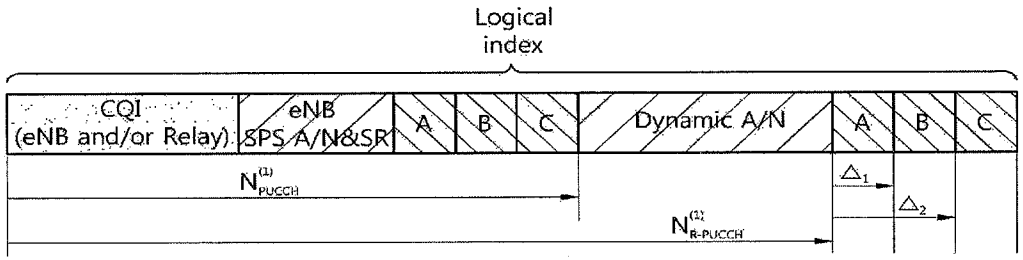
FIG. 20 shows an example of allocating a logical PUCCH index independently for each RS group.

FIG. 20 shows an example of allocating a logical PUCCH index independently for each RS group.

Such a method can be applied when an R-PUCCH resource index at which a backhaul UL ACK/NACK is transmitted is independent for each RS group. For example, assume that R-PUCCH resource indices 0 to 10 are reserved for the RS group A, R-PUCCH resource indices 0 to 20 are reserved for the RS group B, and R-PUCCH resource indices 0 to 15 are reserved for the RS group C. In this case, as shown in FIG. 20, a logical PUCCH index for the RS group A can be given to $N^{(1)}_{R\text{-}PUCCH}$. Then, the R-PUCCH resource index $n^{(1)}_{R\text{-}PUCCH}$ can be determined such as $n_{R\text{-}CCE}+N^{(1)}_{R\text{-}PUCCH}$. A logical PUCCH index for the RS group B can be given to $N^{(1)}_{R\text{-}PUCCH}+\Delta_1$, and $n^{(1)}_{R\text{-}PUCCH}$ for the RS group B can be determined such as $n^{R\text{-}CCE}+N^{(1)}_{R\text{-}PUCCH}+\Delta_1$. A logical PUCCH index for the RS group C can be given to $N^{(1)}_{R\text{-}PUCCH}+\Delta_1+\Delta_2$, and $n^{(1)}_{R\text{-}PUCCH}$ for the RS group C can be determined such as $n_{R\text{-}CCE}+N^{(1)}_{R\text{-}PUCCH}+\Delta_1+\Delta_2$.

Figure 21:
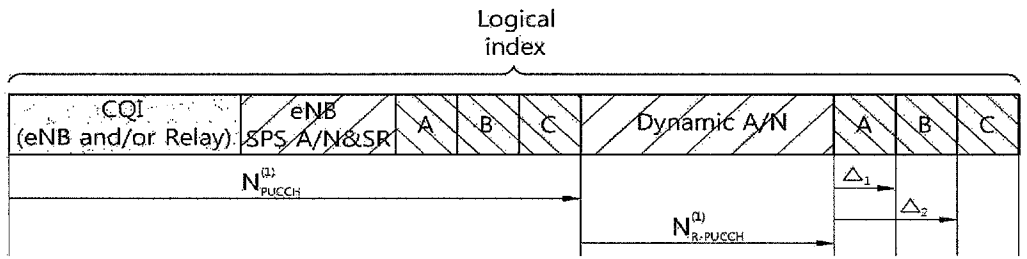
FIG. 21 shows another example of allocating a logical PUCCH index independently for each RS group.

FIG. 21 shows another example of allocating a logical PUCCH index independently for each RS group.

The method of FIG. 21 is different from that of FIG. 20 in a sense that a logical PUCCH index $N^{(1)}_{R\text{-}PUCCH}$ given to an RS group A is an offset value with respect to a logical PUCCH index $N^{(1)}_{PUCCH}$ given to a Ma UE.

Figure 22:
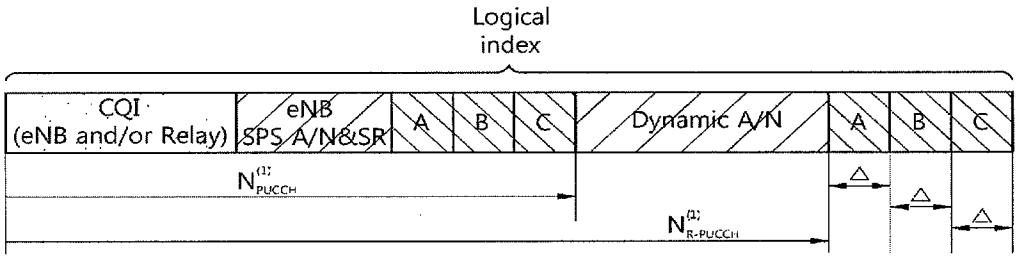
FIG. 22 shows another example of allocating a logical PUCCH index independently for each RS group.

FIG. 22 shows another example of allocating a logical PUCCH index independently for each RS group.

A logical PUCCH index for each RS group has the same index gap Δ. As such, the logical PUCCH index can have the same index gap when a size of an R-PDCCH is equal to $n_{R\text{-}CCE}$. In this case, a logical PUCCH index $N^{(1)}_{R\text{-}PUCCH}$ can be given commonly to each RS group, and only an offset of the logical PUCCH index (i.e., the index gap Δ) can be optionally given for each RS group. Therefore, signaling overhead can be reduced.

Figure 23:
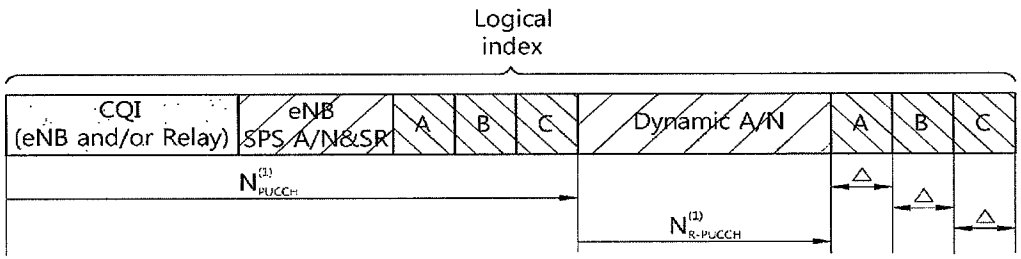
FIG. 23 shows another example of allocating a logical PUCCH index independently for each RS group.

FIG. 23 shows another example of allocating a logical PUCCH index independently for each RS group. The example of FIG. 23 is different from that of FIG. 22 in a sense that $N^{(1)}_{R\text{-}PUCCH}$ given to each RS group is an offset value with respect to a logical PUCCH index $N^{(1)}_{PUCCH}$ given to a Ma UE.

In FIG. 20 to FIG. 23, logical PUCCH index regions 'A', 'B', and 'C' can be switched to on/off according to a traffic amount between a BS and an RS. A bitmap-type signal can be given for on/off of the logical PUCCH index region. For example, if the signal is given to '101', it may imply that 'A' and 'C' are used and 'B' is unused. The BS can report whether to use each logical PUCCH index region by using the bitmap-type signal. Then, the RS can determine an R-PUCCH resource index by determining whether to use the logical PUCCH index region when determining a backhaul UL ACK/NACK resource index.

A1 though $N^{(1)}_{R\text{-}PUCCH}$, $\Delta_1$, and $\Delta_2$ are expressed by a positive value in the description based on FIG. 20 to FIG. 23, the present invention is not limited thereto. That is, $N^{(1)}_{R\text{-}PUCCH}$, $\Delta_1$, and $\Delta_2$ may be a negative value. If these values are negative values, it implies that regions 'A', 'B', and 'C' can be arranged in a different order from that shown in the figures.

In addition, although a method of allocating a logical PUCCH index for determining an R-PUCCH resource index for a dynamic ACK/NACK has been exemplified in the aforementioned description, the present invention is not limited thereto. That is, the present invention is also applicable when determining an R-PUCCH resource index for a case of an SPS ACK/NACK, an SR, and a CQI.

Figure 24:
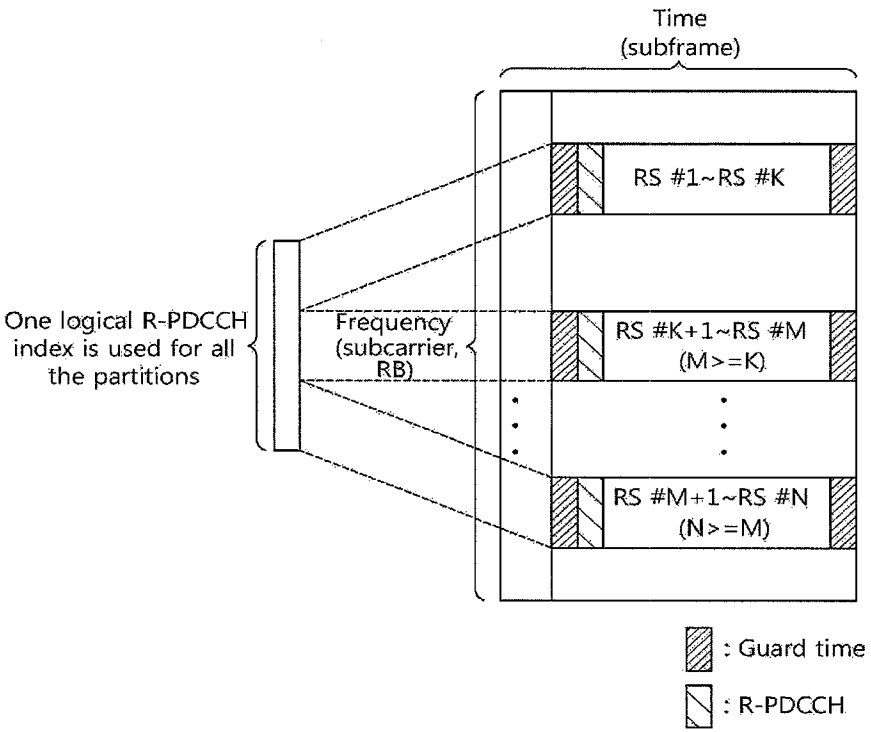
FIG. 24 shows an example in which an R-PDCCH transmitted to a plurality of RS groups is configured such that all R-PDCCHs have one logical index.
Figure 25:
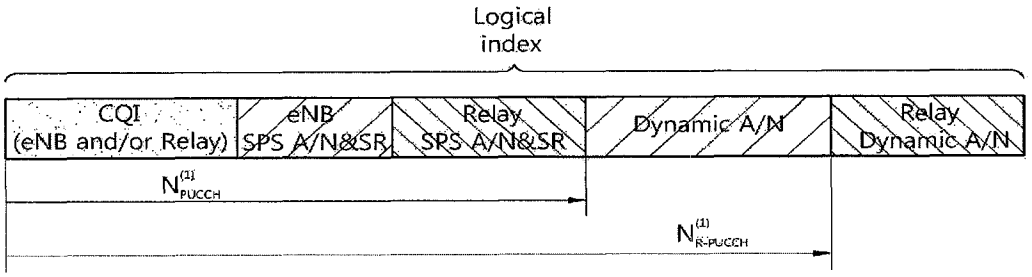
FIG. 25 shows a method of allocating a logical PUCCH index when an R-PDCCH has one logical index similarly to FIG. 24.

FIG. 24 shows an example in which an R-PDCCH transmitted to a plurality of RS groups is configured such that all R-PDCCHs have one logical index. FIG. 25 shows a method of allocating a logical PUCCH index when an R-PDCCH has one logical index similarly to FIG. 24.

Referring to FIG. 24, when a plurality of R-PDCCHs are present in a frequency band which is divided physically, an index of each R-PDCCH, i.e., a CCE index, can be configured so that the index has a logically contiguous value. In this case, the logical PUCCH index can be configured as shown in FIG. 25. That is, a logical PUCCH index can be allocated by separating an SPS resource region (e.g., a resource region for CQI, ACK/NACK, and SR) of a Ma UE and an RS from a resource region for a dynamic ACK/NACK of the Ma UE and the RS. A logical PUCCH index can be first allocated for a CQI, SPS ACK/NACK, and SR allocated to the Ma UE and an SPS ACK/NACK and SR allocated to the RS, and thereafter a logical PUCCH index can be allocated to a dynamic ACK/NACK allocated to the Ma UE and a dynamic ACK/NACK allocated to an RS. In this case, the logical PUCCH index can be allocated in the order of the dynamic ACK/NACK of the Ma UE and the dynamic ACK/NACK of the RS. Then, a plurality of RS groups can determine an R-PUCCH resource index similarly to a method of determining an R-PUCCH resource index in one RS.

Figure 26:
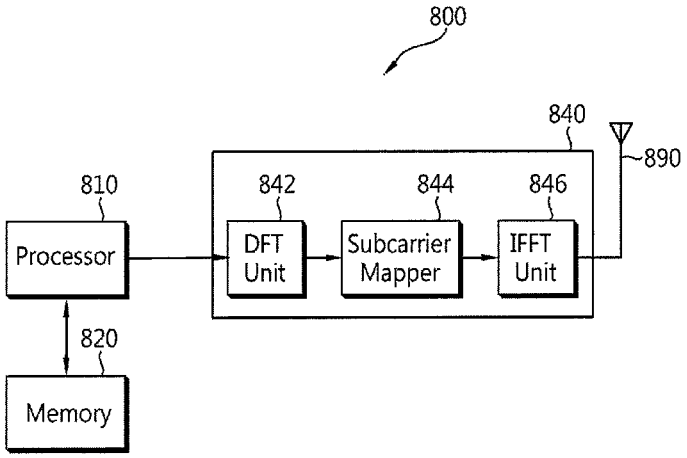
FIG. 26 is a block diagram showing an apparatus for wireless communication according to an embodiment of the present invention.

FIG. 26 is a block diagram showing an apparatus for wireless communication according to an embodiment of the present invention. The apparatus may be a part of an RS.

Referring to FIG. 26, an apparatus 800 for wireless communication includes a processor 810, a memory 820, and a signal generator 840. The memory 820 is coupled to the processor 810, and stores an operating system file. The processor 810 is coupled to the memory 820, and configures a backhaul UL control channel. The processor 810 acquires a CCE index through an R-PDCCH and a logical PUCCH index by using a higher layer signal to obtain an R-PUCCH resource index. A backhaul UL control signal is processed by using a radio resource allocated through an R-PUCCH resource index. The signal generator 840 generates a transmission signal to be transmitted through an antenna 890 from the backhaul UL control signal processed by the processor 810.

The signal generator 840 can generate a transmission signal based on an SC-FDMA scheme. For this, the signal generator 840 can include a discrete Fourier transform (DFT) unit 842 for performing DFT, a subcarrier mapper 844, and an inverse fast Fourier transform (IFFT) unit 846 for performing IFFT. The DFT unit 842 outputs a frequency-domain symbol by performing DFT on an input sequence. The subcarrier mapper 844 maps frequency-domain symbols to respective subcarriers. The IFFT unit 846 outputs a time-domain signal by performing IFFT on an input symbol. The time-domain signal is transmitted through the antenna 890 as a transmission signal. The time-domain signal generated by the signal generator 840 can be generated according to the SC-FDMA scheme.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

[1. A method of transmitting a control signal of a relay station, the method comprising:

receiving, by the relay station, a control signal and data from a base station in a first subframe; and transmitting, by the relay station, an acknowledgement/negative acknowledgement (ACK/NACK) signal for the data to the base station in a second subframe, wherein a radio resource for transmitting the ACK/NACK signal is determined by a radio resource to which the control signal received in the first subframe is allocated and by a logical physical uplink control channel (PUCCH) index received by using a higher layer signal, wherein the logical PUCCH index is allocated first to a PUCCH resource allocated to a macro user equipment coupled to the base station, is allocated second to a PUCCH resource allocated to an Semi-Persistent Scheduling (SPS) ACK/NACK and scheduling request signal resource allocated to the relay station, and is allocated third to a PUCCH resource allocated to a dynamic ACK/NACK resource allocated to the relay station, and wherein the logical PUCCH index indicates the dynamic ACK/NACK resource allocated to the relay station directly or indicates the dynamic ACK/NACK resource allocated to the relay station by the offset value with respect to the logical PUCCH index value transmitted to the macro user equipment.]

[2. The method of claim 1, wherein the logical PUCCH index is first allocated to a PUCCH resource which is allocated to a macro user equipment coupled to the base station, and is then allocated to an R-PUCCH resource which is allocated to the relay station.]

[3. The method of claim 1, wherein the logical PUCCH index transmitted to the relay station is an offset value with respect to a logical PUCCH index value which is transmitted to a macro user equipment coupled to the base station.]

[4. The method of claim 1, wherein the logical PUCCH index is first allocated to a Semi-Persistent Scheduling (SPS) radio resource allocated to the macro user equipment coupled to the relay station and the base station and is then allocated to a dynamic radio resource allocated to the relay station and the macro user equipment.]

[5. The method of claim 1, wherein if the relay station fails to receive the control signal in the first frame, the ACK/NACK signal is transmitted through a radio resource determined according to a configuration given by a higher layer signal.]

[6. An apparatus for wireless communication, the apparatus comprising:

a signal generator for generating and transmitting a radio signal; and a processor coupled to the signal generator, wherein the processor receives a control signal and data from a base station in a first subframe, and transmits an acknowledgement/negative acknowledgement (ACK/NACK) signal for the data to the base station in a second subframe, wherein the ACK/NACK signal is allocated to a radio resource determined by a radio resource to which the control signal received in the first subframe is allocated and a logical physical uplink control channel (PUCCH) index received by using a higher layer signal, wherein the logical PUCCH index is allocated first to a PUCCH resource allocated to a macro user equipment coupled to the base station, is allocated second to a PUCCH resource allocated to an Semi-Persistent Scheduling (SPS) ACK/NACK and scheduling request signal resource allocated to the relay station, and is allocated third to a PUCCH resource allocated to a dynamic ACK/NACK resource allocated to the relay station, and wherein the logical PUCCH index indicates the dynamic ACK/NACK resource allocated to the relay station directly or indicates the dynamic ACK/NACK resource allocated to the relay station by the offset value with respect to the logical PUCCH index value transmitted to the macro user equipment.]

*7. A method of transmitting a control signal, the method comprising:*

*transmitting, by a base station, a control signal and data to a relay station in a first subframe; and*

*receiving, by the base station, an acknowledgement/negative acknowledgement (ACK/NACK) signal for the data from the relay station in a second subframe,*

*wherein a radio resource for the ACK/NACK signal is determined by a radio resource to which the control signal is allocated and by a logical physical uplink control channel (PUCCH) index defined by using a higher layer signal,*

*wherein the logical PUCCH index is allocated first to a PUCCH resource allocated to a macro user equipment coupled to the base station, is allocated second to a PUCCH resource allocated to a Semi-Persistent Scheduling (SPS) ACK/NACK and scheduling request signal resource allocated to the relay station, and is allocated third to a PUCCH resource allocated to a dynamic ACK/NACK resource allocated to the relay station, and*

*wherein the logical PUCCH index indicates the dynamic ACK/NACK resource allocated to the relay station directly or indicates the dynamic ACK/NACK resource allocated to the relay station by the offset value with respect to the logical PUCCH index value transmitted to the macro user equipment.*

*8. The method of claim 7, wherein the logical PUCCH index is first allocated to the PUCCH resource which is allocated to the macro user equipment coupled to the base station, and is then allocated to a relay-PUCCH (R-PUCCH) resource which is allocated to the relay station.*

*9. The method of claim 7, wherein the logical PUCCH index is allocated to the relay station and is an offset value with respect to a logical PUCCH index value which is transmitted to the macro user equipment coupled to the base station.*

*10. The method of claim 7, wherein the logical PUCCH index is first allocated to an SPS radio resource allocated to the macro user equipment which is coupled to the relay station and the base station and is then allocated to a dynamic radio resource allocated to the relay station and the macro user equipment.*

* * * * *